United States Patent
Byon et al.

(10) Patent No.: US 11,869,265 B2
(45) Date of Patent: Jan. 9, 2024

(54) OBJECT TRACKING SYSTEM AND OBJECT TRACKING METHOD

(71) Applicant: Electronics and Telecommunications Research Institute, Daejeon (KR)

(72) Inventors: Sungwon Byon, Daejeon (KR); Eun Jung Kwon, Daejeon (KR); Hyunho Park, Daejeon (KR); Won-Jae Shin, Daejeon (KR); Dong Man Jang, Sejong-si (KR); Eui Suk Jung, Daejeon (KR); Yong Tae Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 351 days.

(21) Appl. No.: 17/191,981

(22) Filed: Mar. 4, 2021

(65) Prior Publication Data

US 2021/0279455 A1 Sep. 9, 2021

(30) Foreign Application Priority Data

Mar. 6, 2020 (KR) .................. 10-2020-0028287

(51) Int. Cl.
*G06V 40/10* (2022.01)
*H04N 7/18* (2006.01)
(Continued)

(52) U.S. Cl.
CPC ............. *G06V 40/10* (2022.01); *G06T 7/20* (2013.01); *G06V 20/10* (2022.01); *H04N 7/185* (2013.01)

(58) Field of Classification Search
CPC ........ G06V 40/10; G06V 20/10; G06V 20/52; G06T 7/20; G06T 7/11; H04N 7/185
(Continued)

(56) References Cited

U.S. PATENT DOCUMENTS 10,410,278 B2 * 9/2019 Altermatt ........... G06Q 30/0645
11,436,827 B1 * 9/2022 Ho ........................ H04W 4/025
(Continued)

FOREIGN PATENT DOCUMENTS

CN 110276789 A * 9/2019 ............. G06T 7/292
KR 10-1512141 B1 4/2015
(Continued)

*Primary Examiner* — Matthew C Bella
*Assistant Examiner* — Pardis Sohraby
(74) *Attorney, Agent, or Firm* — NSIP Law

(57) ABSTRACT

Provided are an object tracking system and an object tracking method. The object tracking system includes: a terminal identifier and reference time providing module configured to receive an identifier of a terminal and a reference time for tracking an object corresponding to the identifier; a cross-CCTV detection module configured to detect a cross-CCTV for the terminal by using a CCTV installation information and a location of the terminal before the reference time; a basic image detection module configured to detect an object repeatedly appearing in the cross-CCTV as a basic image; a current-CCTV detection module configured to detect a current-CCTV currently recording the terminal by detecting a location and a moving direction of the terminal after the reference time; an object detection module configured to detect an object appearing in the current-CCTV based on the location and the moving direction of the terminal after the reference time; and an object tracking module configured to track an object corresponding to the identifier by determining whether the detected object from the current-CCTV and the basic image.

20 Claims, 9 Drawing Sheets

(51) Int. Cl.
*G06T 7/20* (2017.01)
*G06V 20/10* (2022.01)
(58) Field of Classification Search
USPC .......................................................... 382/100
See application file for complete search history.

(56) References Cited

U.S. PATENT DOCUMENTS

| 2012/0045096 | A1* | 2/2012 | Naito ..................... G06V 20/52 |
| | | | 382/103 |
| 2014/0348380 | A1 | 11/2014 | Yoon et al. |
| 2015/0332476 | A1* | 11/2015 | Park ....................... G06V 40/20 |
| | | | 348/169 |
| 2016/0358019 | A1* | 12/2016 | Kato ........................ H04W 4/02 |
| 2018/0053303 | A1* | 2/2018 | Leuschner ............. H04N 23/60 |
| 2019/0297093 | A1* | 9/2019 | Kurian ................ H04L 63/1416 |
| 2020/0027333 | A1* | 1/2020 | Xu .......................... G08G 1/164 |
| 2020/0097735 | A1* | 3/2020 | Altuev ................. G06V 40/169 |
| 2020/0175697 | A1 | 6/2020 | Jeon et al. |

FOREIGN PATENT DOCUMENTS

| KR | 10-2017-0050225 A | 5/2017 |
| KR | 10-1897505 B1 | 9/2018 |

* cited by examiner

OBJECT TRACKING SYSTEM AND OBJECT TRACKING METHOD

CROSS-REFERENCE TO RELATED APPLICATION

This application claims priority to and the benefit of Korean Patent Application No. 10-2020-0028287 filed in the Korean Intellectual Property Office on Mar. 6, 2020, the entire contents of which are incorporated herein by reference.

BACKGROUND

(a) Field

The present disclosure relates to an object tracking system and an object tracking method.

(b) Description of Related Art

A technology that analyzes CCTV (closed-circuit television) video to extract objects in the video and classifies the objects according to their characteristics is becoming more complete through the development of machine learning technology. Using such technology, it is possible to classify objects, such as people, cars, animals, buildings, traffic lights, etc., by type or determine the identity of the objects, as well as automatically calculate the number of customers entering and leaving a building through CCTVs installed in the building.

In an environment where an object is tracked for a person, it is necessary to detect a person appearing in multiple CCTVs. For example, by detecting a specific object from the video recorded by CCTV according to the moving line of a person, it is possible to determine whether it is an unusual situation, such as an accident. In addition, image object re-identification may be performed to re-identify a specific known object from the video recorded by other CCTV. The image object re-identification refers to inputting an image already known for representing the specific known object, and detecting an object in the target video that is determined to be the same as the object represented by the input image. Image object re-identification has recently been implemented using machine learning technology, and accordingly, re-identification accuracy is greatly improved.

However, since a lot of computing power is required to perform extracting, classifying and re-identifying objects from video, there is a need for a way to perform these tasks more efficiently.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide to an object tracking system and an object tracking method having advantages of identifying a target object from a CCTV video and tracking the target object over a plurality of CCTV videos by using location information of a terminal capable of location tracking.

An example embodiment of the present disclosure provides an object tracking system including a terminal identifier and reference time providing module configured to receive an identifier of a terminal and a reference time for tracking an object corresponding to the identifier; a cross-CCTV detection module configured to detect a cross-CCTV for the terminal by using a CCTV installation information and a location of the terminal before the reference time; a basic image detection module configured to detect an object repeatedly appearing in the cross-CCTV as a basic image; a current-CCTV detection module configured to detect a current-CCTV currently recording the terminal by detecting a location and a moving direction of the terminal after the reference time; an object detection module configured to detect an object appearing in the current-CCTV based on the location and the moving direction of the terminal after the reference time; and an object tracking module configured to track an object corresponding to the identifier by determining whether the detected object from the current-CCTV and the basic image.

According to an embodiment of the present disclosure, the cross-CCTV detection module detects locations of the terminal at a first time point and a second time point, and detects, among CCTVs included in the CCTV installation information, a CCTV in which a recording area is located within a predetermined distance from a line segment connecting the locations of the terminal, as the cross-CCTV.

According to an embodiment of the present disclosure, the cross-CCTV detection module detects a time when the object corresponding the identifier is exposed to the recording area based on a distance between the recording area and the line segment.

According to an embodiment of the present disclosure, when the cross-CCTV is not detected, the cross-CCTV detection module detects the cross-CCTV for the terminal by using the CCTV installation information and the location of the terminal at a time earlier than the reference time.

According to an embodiment of the present disclosure, the current-CCTV detection module detects a moving direction of the terminal from the locations of the terminal at a first time point and a second time point, and detects, among CCTVs included in the CCTV installation information, a CCTV in which a recording area is located in the moving direction, as the current-CCTV.

According to an embodiment of the present disclosure, the current-CCTV detection module detects a time when the object corresponding the identifier is exposed to the recording area based on a moving speed of the terminal and a distance between the recording area to the terminal at the second time point.

According to an embodiment of the present disclosure, when the current-CCTV is not detected, after waiting for a predetermined time, the current-CCTV detection module detects the current-CCTV by detecting the location and the moving direction of the terminal.

According to an embodiment of the present disclosure, the current-CCTV detection module detects a moving direction of the terminal by using the locations of the terminal at the first time point and the second time point.

According to an embodiment of the present disclosure, the current-CCTV detection module detects a moving direction of the terminal by using a gyro sensor mounted on the terminal.

According to an embodiment of the present disclosure, the basic image detection module updates an object detected from the current-CCTV by the object detection module to the basic image, and the object tracking module tracks an object corresponding to the identifier by determining whether the detected object from the current-CCTV and the updated basic image.

Another embodiment of the present disclosure provides an object tracking system including, a cross-CCTV detection module configured to detect a cross-CCTV for a terminal by using a CCTV installation information and a location of the terminal before a reference time; a basic image detection module configured to detect an object repeatedly appearing in the cross-CCTV as a basic image; a current-CCTV detection module configured to detect a current-CCTV currently recording the terminal by detecting a location and a moving direction of the terminal after the reference time; and an object detection module configured to detect an object appearing in the current-CCTV based on the location and the moving direction of the terminal after the reference time, the basic image detection module updates an object detected from the current-CCTV by the object detection module, to the basic image.

According to an embodiment of the present disclosure, the method further includes an object tracking module configured to track an object corresponding to the identifier by determining whether the detected object from the current-CCTV and the basic image, wherein the object tracking module tracks an object corresponding to the identifier by determining whether the detected object from the current-CCTV and the updated basic image.

According to an embodiment of the present disclosure, the cross-CCTV detection module detects locations of the terminal at a first time point and a second time point, and detects, among CCTVs included in the CCTV installation information, a CCTV in which a recording area is located within a predetermined distance from a line segment connecting the locations of the terminal, as the cross-CCTV.

According to an embodiment of the present disclosure, the current-CCTV detection module detects a moving direction of the terminal from the locations of the terminal at a first time point and a second time point, and detects, among CCTVs included in the CCTV installation information, a CCTV in which a recording area is located in the moving direction, as the current-CCTV.

Yet another embodiment of the present disclosure provides an object tracking method including, receiving an identifier of a terminal and a reference time for tracking an object corresponding to the identifier; detecting a cross-CCTV for the terminal by using a CCTV installation information and a location of the terminal before the reference time; detecting an object repeatedly appearing in the cross-CCTV as a basic image; detecting a current-CCTV currently recording the terminal by detecting a location and a moving direction of the terminal after the reference time; detecting an object appearing in the current-CCTV based on the location and the moving direction of the terminal after the reference time; and tracking an object corresponding to the identifier by determining whether the detected object from the current-CCTV and the basic image.

According to an embodiment of the present disclosure, wherein the detecting a cross-CCTV for the terminal by using a CCTV installation information and a location of the terminal before the reference time includes detecting locations of the terminal at a first time point and a second time point, and detecting, among CCTVs included in the CCTV installation information, a CCTV in which a recording area is located within a predetermined distance from a line segment connecting the locations of the terminal, as the cross-CCTV.

According to an embodiment of the present disclosure, wherein the detecting, among CCTVs included in the CCTV installation information, a CCTV in which a recording area is located within a predetermined distance from a line segment connecting the locations of the terminal, as the cross-CCTV includes when the cross-CCTV is not detected, detecting the cross-CCTV for the terminal by using the CCTV installation information and the location of the terminal at a time earlier than the reference time.

According to an embodiment of the present disclosure, wherein the detecting a current-CCTV currently recording the terminal by detecting a location and a moving direction of the terminal after the reference time includes detecting a moving direction of the terminal from the locations of the terminal at a first time point and a second time point, and detecting, among CCTVs included in the CCTV installation information, a CCTV in which a recording area is located in the moving direction, as the current-CCTV.

According to an embodiment of the present disclosure, wherein the detecting, among CCTVs included in the CCTV installation information, a CCTV in which a recording area is located in the moving direction, as the current-CCTV includes when the current-CCTV is not detected, after waiting for a predetermined time, detecting the current-CCTV by detecting the location and the moving direction of the terminal.

According to an embodiment of the present disclosure, wherein the detecting an object repeatedly appearing in the cross-CCTV as a basic image includes updating an object detected from the current-CCTV, to the basic image, and the tracking an object corresponding to the identifier by determining whether the detected object from the current-CCTV and the basic image includes tracking an object corresponding to the identifier by determining whether the detected object from the current-CCTV and the updated basic image.

According to embodiments of the present disclosure, through a terminal capable of location tracking, it is possible to collect the location history and the current location of the terminal, and detect a CCTV in which an object that moves while carrying the terminal was recorded, the recording time, the moving direction of the object, the moving speed and so on, it is possible to efficiently perform object detection from CCTV video.

In addition, according to embodiments of the present disclosure, through a terminal capable of location tracking, it is possible to efficiently track a target object from a plurality of CCTV videos.

DETAILED DESCRIPTION

Figure 1:
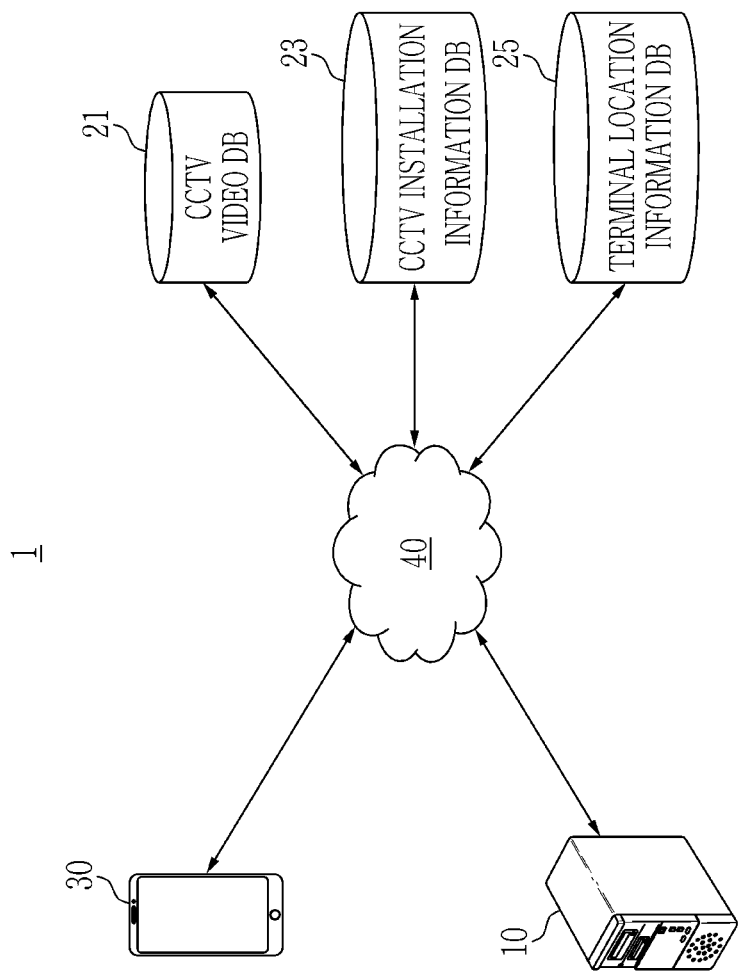
FIG. 1 is a conceptual diagram of an object tracking system according to an embodiment of the present disclosure.

Hereinafter, embodiments of the present disclosure will be described in detail with reference to the accompanying drawings so that those of ordinary skill in the art may easily implement the present disclosure. However, the present disclosure may be implemented in various different ways and is not limited to the embodiments described herein.

In the drawings, parts irrelevant to the description are omitted in order to clearly describe the present disclosure, and like reference numerals are assigned to like elements throughout the specification.

Throughout the specification and claims, unless explicitly described to the contrary, the word "comprise", and variations such as "comprises" or "comprising", will be understood to imply the inclusion of stated elements but not the exclusion of any other elements. In addition, terms such as " . . . unit", " . . . group", and "module" described in the specification mean a unit that processes at least one function or operation, and it can be implemented as hardware or software or a combination of hardware and software.

FIG. 1 is a conceptual diagram of an object tracking system according to an embodiment of the present disclosure.

Referring to FIG. 1, an object tracking system 1 according to an embodiment of the present disclosure may include a server 10, a CCTV video database 21, a CCTV installation information database 23, a terminal location information database 25, and a terminal 30. In FIG. 1, for convenience of explanation, it is described that the object tracking system is mainly implemented as the server 10, but the scope of the present disclosure is not limited thereto.

Specifically, the object tracking system 1 described herein may be implemented as one or more computing devices. The computing device may be, for example, a smart phone, a smart watch, a smart band, a tablet computer, a notebook computer, a desktop computer, a server, etc., but the scope of the present disclosure is not limited thereto, the computing device may be any type of computer device having a memory and a processor capable of storing and executing computer instructions.

The functions of the object tracking system 1 may all be implemented on a single computing device, or may be implemented separately on a plurality of computing devices. For example, the plurality of computing devices may include a first computing device and a second computing device, and some functions of the object tracking system 1 may be implemented on the first computing device, and some other functions of the object tracking system 1 may be implemented on the second computing device. In addition, the first computing device and the second computing device may communicate with each other through the network 40.

Meanwhile, the server 10, the CCTV video database 21, the CCTV installation information database 23, the terminal location information database and the terminal 30 may exchange data with each other through the network 40.

Here, the network 40 is a wireless network such as a cellular network, a Wi-Fi network, a Bluetooth network, or the like, a wired network such as a local area network (LAN), a wide local area network (WLAN), or the like, or a combination of a wireless network and a wired network, but the scope of the present disclosure is not limited thereto.

The server 10 may identify a target object from the CCTV video using the location information of the terminal 30 capable of location tracking, or track the target object over multiple CCTV videos using the location information of the terminal 30 capable of location tracking. To this end, the server 10 may include a terminal identifier and reference time providing module 110, a cross-CCTV detection module 120, a basic image detection module 130, an object detection module 140, a current-CCTV detection module 150, and an object tracking module 160.

The CCTV video database 21 may be a database for storing and managing CCTV videos. Specifically, the CCTV video database 21 may store CCTV videos recorded by a plurality of CCTVs together with corresponding CCTV information, and may provide the CCTV videos to the basic image detection module 130. Here, the CCTV video may include not only a CCTV video recorded in the past, but also a CCTV video currently being recorded.

The CCTV installation information database 23 may be a database for storing and managing information related to the installation location of the CCTV, the location of the CCTV recording area, and the recording direction of the CCTV.

The terminal location information database 25 may be a database for storing and managing information related to the location history of the terminal 30. Here, the location history of the terminal 30 may be information on which locations of the terminal 30 are recorded by time, by using a location tracking device mounted on the terminal 30.

The distinction between of the CCTV video database 21, the CCTV installation information database 23, and the terminal location information database 25 is only a logical distinction, but does not imply a physical distinction, so these elements may be implemented in any of a variety of ways. For example, one of these elements can be implemented in one physical device or multiple physical devices, or some or all of these elements can be implemented in one physical device.

The terminal 30 may refer to a terminal carried by an object (e.g., a person) to be tracked. That is, the object to be tracked can move while carrying the terminal 30, and the server 10 can identify the object from the CCTV video or perform tracking the object using the location information of the terminal 30.

When performing object re-identification on a video recorded by a CCTV, in general, an image prepared in advance can be used. The image to be compared to re-identify the object is called a base image.

If the location history collected through the terminal 30 can be used, the past moving line before the current location of the object carrying the terminal 30 can be detected using the location history. By using the moving line, it is possible to detect the CCTV that overlapped with the past moving line, and the time when the CCTV was crossed. When searching CCTV video corresponding to the detected CCTV (i.e., cross-CCTV) and the crossing time, objects appearing in the video can be detected.

When there are two or more cross-CCTVs and crossing times, the object that appear repeatedly over cross-CCTVs among the objects appearing in each cross-CCTV video may be the object to be tracked. If the location history of a specific object has a greater number of cross-CCTVs, and the number of times that the object repeatedly appears in the cross-CCTV videos increases, the possibility of the object being a target object to be tracked also increases. In this way, a basic image of a target object can be obtained.

While the current location of the terminal 30 is being collected, it is possible to detect a CCTV that is currently close to the terminal 30. Using the current location information, it is possible to identify a CCTV recording currently or a CCTV to which an object will be exposed soon, and object re-identification can be performed by inputting a basic image previously acquired from a corresponding CCTV video.

Figure 2:
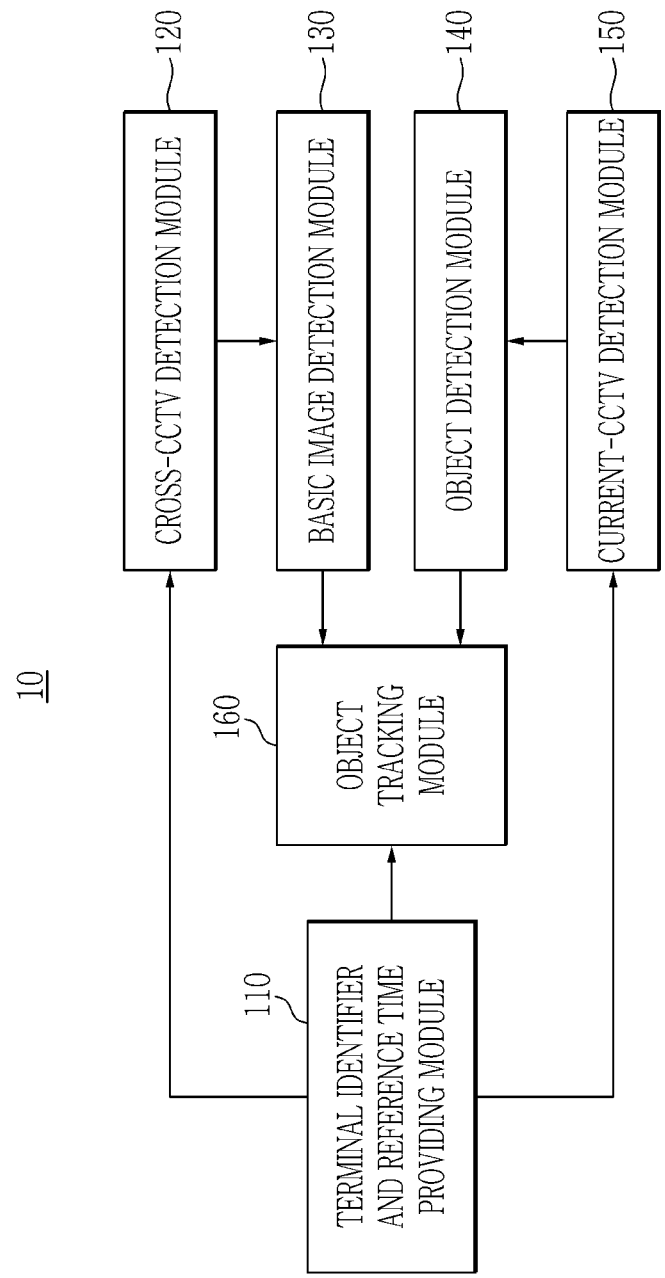
FIG. 2 is a block diagram of an object tracking system according to an embodiment of the present disclosure.

FIG. 2 is a block diagram of an object tracking system according to an embodiment of the present disclosure.

Referring to FIG. 2, the server 10 of the object tracking system 1 according to an embodiment of the present disclosure may include a terminal identifier and reference time providing module 110, a cross-CCTV detection module 120, a basic image detection module 130, an object detection module 140, a current-CCTV detection module 150, and an object tracking module 160.

The terminal identifier and reference time providing module 110 may receive an input of an identifier of the terminal 30 and a reference time for tracking an object corresponding to the identifier.

Specifically, the terminal identifier and reference time providing module 110 provides the reference time and the identifier of the terminal 30 capable of location tracking and carried by the object to be tracked to the cross-CCTV detection module 120, the basic image detection module 130, the object detection module 140, the current-CCTV detection module 150, and the object tracking module 160.

Here, the identifier may include any type of information that can uniquely identify the terminal 30, such as a phone number. Meanwhile, the reference time means a reference time for tracking a target object, and the reference time may be a past time or a current time. If the reference time is in the past, assuming that the past time is present, object tracking may be performed on a video recorded after the past time, and if the reference time is present, object tracking may be performed on a video recorded after the current time.

The cross-CCTV detection module 120 and the basic image detection module 130 may detect an image before the reference time of the object corresponding to the identifier of the terminal 30 capable of location tracking, for example, in the CCTV video database 21.

The cross-CCTV detection module 120, by using the location of the terminal before the reference time and the CCTV installation information, it is possible to detect cross-CCTVs for the terminal 30.

Specifically, the cross-CCTV detection module 120 may obtain the location history of the terminal 30 before the reference time, for example, from the terminal location information database 25, and detect CCTVs that the terminal crossed while moving, for example, from the CCTV installation information database 23. The CCTV installation information database 23 may provide information on the location of the CCTV recording area and the recording direction of the CCTV to the cross-CCTV detection module 120. In addition, the cross-CCTV detection module 120 may detect a moving speed and a moving direction of the terminal 30.

Meanwhile, in some embodiments of the present disclosure, when the cross-CCTV is not detected, the cross-CCTV detection module 120 may detect the cross-CCTV for the terminal 30 by using the CCTV installation information and the location of the terminal 30 at a time earlier than the reference time.

The basic image detection module 130 may detect an object that repeatedly appears in the cross-CCTV as a basic image.

Specifically, the basic image detection module 130 may extract an object that satisfies predetermined conditions from each cross-CCTV by using the CCTV passing time, the moving direction, and the moving speed of the terminal 30 which are provided by the cross-CCTV detection module 120, and detect an object that repeatedly appears in a plurality of cross-CCTVs. In this case, an object that is detected to appear repeatedly in a plurality of CCTVs can be determined as a basic image.

The object detection module 140 and the current-CCTV detection module 150 may detect an object recorded by a CCTV after the reference time.

First, the current-CCTV detection module 150 may detect the current-CCTV recording the terminal 30 by detecting the location and moving direction of the terminal 30 after the reference time.

Specifically, the current-CCTV detection module 150 may detect the final location and the moving direction of the terminal 30, for example, using the terminal location information database 25 and the CCTV installation information database 23, and based on these, and provide information such as information related to CCTV in the current recording area of in the direction approaching the recording area, the expected time of crossing CCTV, and the expected direction of passage to the object detection module 140.

Meanwhile, in some embodiments of the present disclosure, when the current-CCTV is not detected, after waiting for a predetermined time, the current-CCTV detection module 150 detects the current-CCTV by detecting the location and the moving direction of the terminal 30.

The object detection module 140 may detect an object currently appearing in the CCTV based on the location and moving direction of the terminal 30 after the reference time.

Specifically, the object detection module 140 may receive CCTV information from the current-CCTV detection module 150, detect an object designated according to the expected exposure time and the expected passing direction of the object from the designated CCTV, and determine whether the image represents the same object as the object represented by the basic image detected by the detection module 130. If it is determined to be the same object, a video or image representing the object may be provided to the object tracking module 160, or the video or image may be used by outputting by itself.

The object tracking module 160 may track the object corresponding to the identifier by determining whether the detected object from the current-CCTV and the basic image.

Specifically, working with the terminal identifier and reference time providing module 110, the cross-CCTV detection module 120, the basic image detection module 130, the object detection module 140, and the current-CCTV detection module 150, may perform object re-identification from the video of CCTV camera recording the object according to a change in time or a change in the position of the object.

In some embodiments of the present disclosure, the basic image detection module 130 may update the object detected from the current-CCTV by the object detection module 140 to the basic image, and the object tracking module 160 may track the object corresponding to the identifier by determining whether the detected object from the current-CCTV and the updated basic image.

Figure 3:
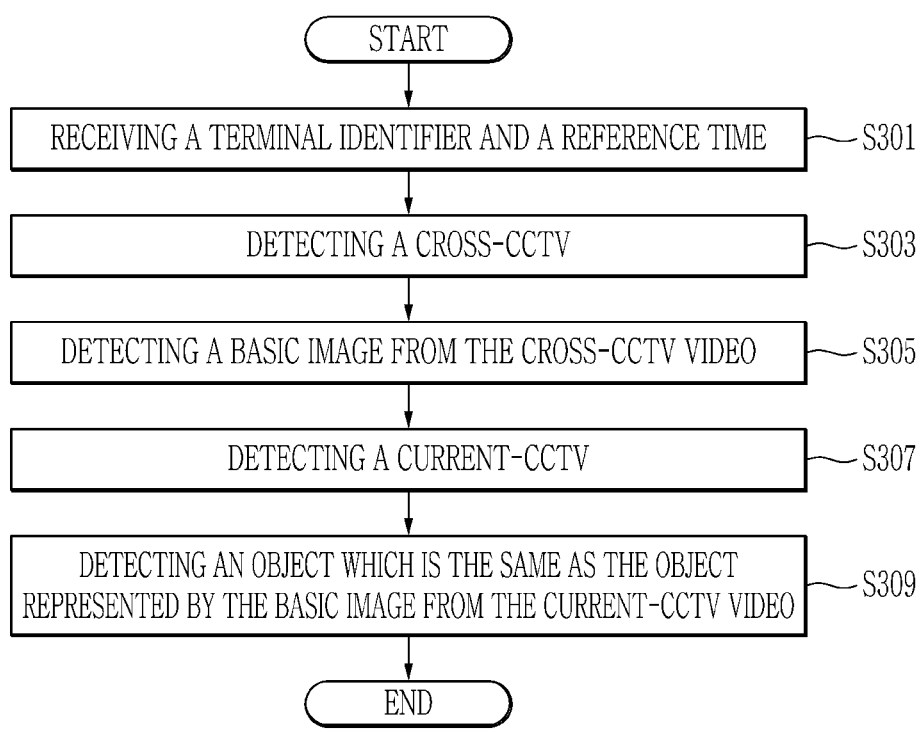
FIG. 3 is a flowchart of an object tracking method according to an embodiment of the present disclosure.

FIG. 3 is a flowchart of an object tracking method according to an embodiment of the present disclosure.

Referring to FIG. 3, an object tracking method according to an embodiment of the present disclosure may include: receiving a terminal identifier (id) and a reference time (t) (S301); detecting a cross-CCTV (pCC) based on the terminal identifier (id) and the reference time (t) (S303); detecting a basic image (bImg) from the cross-CCTV video based on the cross-CCTV (pCC) (S305); detecting a current-CCTV (nCC) based on the terminal identifier (id) and the reference time (t) (S307); and detecting an object (nObj) which is the same as the object represented by the basic image (bImg) from the current-CCTV video based on the current-CCTV (nCC) and the basic image (bImg) (S309). Here, the reference time (t) may be a past time or a current time.

In S303, the cross-CCTV (pCC) information may include, when the target object was recorded by a specific CCTV at a certain point in the past, the estimated time period of recording, the identifier of the recording CCTV, the moving direction in the recorded video.

Meanwhile, in S307, the current-CCTV (nCC) information may include, the time period when the object is to be exposed to the CCTV video, the identifier of the CCTV, and the moving angle of the object.

Figure 4:
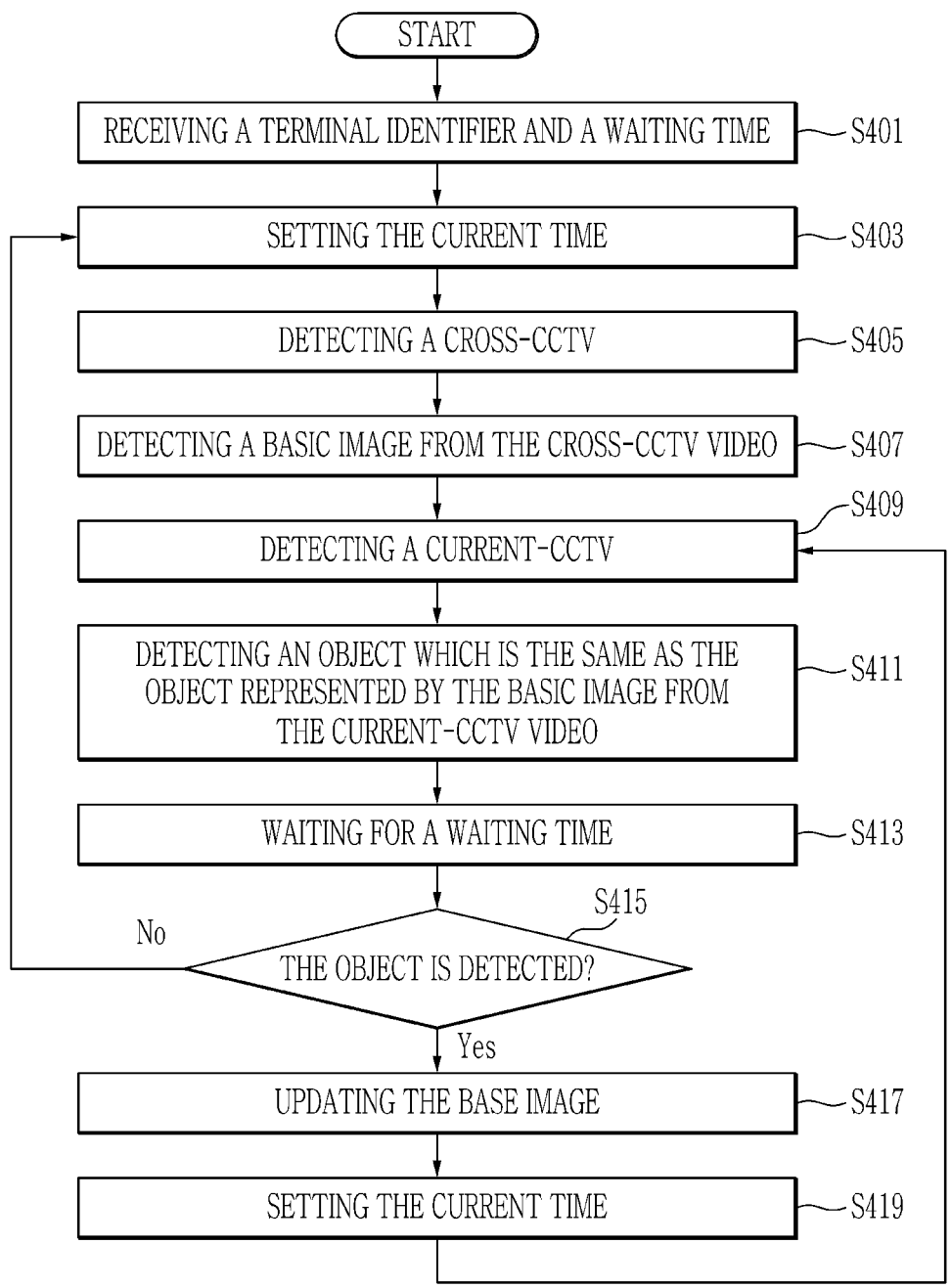
FIG. 4 is a flowchart of an object tracking method according to an embodiment of the present disclosure.

FIG. 4 is a flowchart of an object tracking method according to an embodiment of the present disclosure.

Referring to FIG. 4, unlike FIG. 3, in order to perform object re-identification based on the current time, an object tracking method according to an embodiment of the present disclosure may include:

receiving a terminal identifier (id) and a waiting time (wt) (S401); setting the current time (S403); detecting a cross-CCTV (pCC) based on a terminal identifier (id) and a reference time (t) (S405); detecting a basic image (bImg) from the cross-CCTV video based on the cross-CCTV (pCC) (S407); detecting a current-CCTV (nCC) based on the terminal identifier (id) and the reference time (t) (S409); detecting an object (nObj) which is the same as the object represented by the basic image (bImg) from the current-CCTV video based on the current-CCTV (nCC) and the basic image (bImg) (S411); and waiting for a waiting time (wt) (S413). Here, the waiting time (wt) may be set to, for example, 1 second, but the scope of the present disclosure is not limited thereto.

In addition, the object tracking method may further include determining whether the object (nObj) is detected (S415), and when the object (nObj) is not detected (S415, No), the object tracking method may proceed to S403. Alternately, when an object (nObj) is detected (S415, Yes), the object tracking method may perform updating the base image (S417) and setting the current time (S419) of setting the current time, and proceed to S409. Here, S417 may be performed by integrating a new image (nImg) for the detected object (nObj) into the basic image (bImg), but the scope of the present disclosure is not limited thereto.

According to the present embodiment, it is possible to continuously detect an object from CCTV video in which an object appears in the future. In order to detect location changes of the object and a CCTV approaching in response to the location changes of the object at a predetermined time interval, a waiting time (wt) is defined in S401, and waiting for a waiting time (wt) of S413 is performed, and it is possible to repeatedly detect and track the object according to the current time which is continuously updated. The current object extracted based on the current time may be used as a basic image in a subsequent object detection attempt after some time elapses. To this end, S417 may add the detected image of the object according to the current time to the base image.

Figure 5:
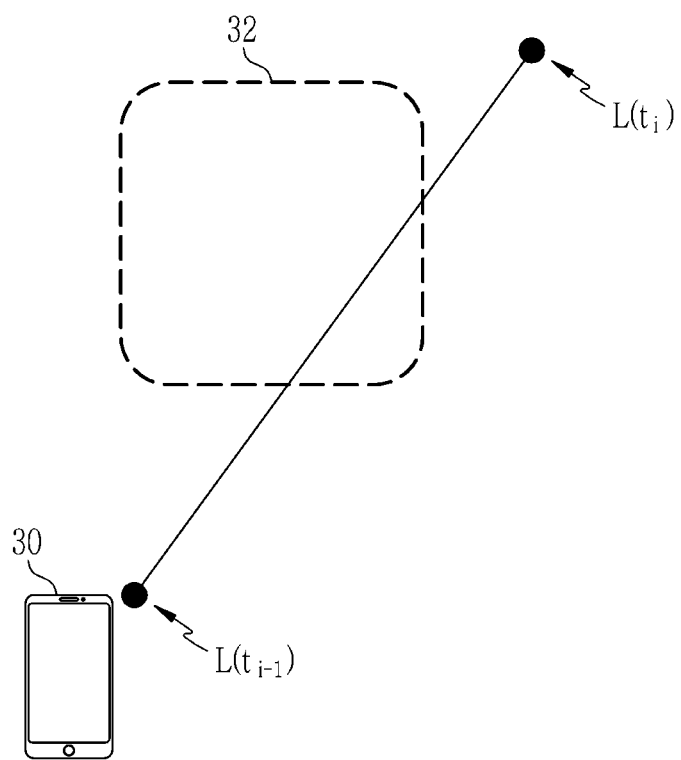
FIG. 5 is a diagram of an object tracking method according to an embodiment of the present disclosure.

FIG. 5 is a diagram of an object tracking method according to an embodiment of the present disclosure.

Referring to FIG. 5, an example method for the cross-CCTV detection module 120 to detect a cross-CCTV is shown.

The cross-CCTV detection module 120 may detect locations ($L(t_{i-1})$, $L(t_i)$) of the terminal 30 at a first time point ($t_{i-1}$) and a second time point ($t_i$), and detects, among CCTVs included in the CCTV installation information, a CCTV in which a recording area 32 is located within a predetermined distance from a line segment connecting the locations of the terminal 30, as the cross-CCTV.

Meanwhile, in some embodiments of the present disclosure, the cross-CCTV detection module 120 may detect a time when the object corresponding the identifier is exposed to the recording area based on a distance between the recording area and the line segment.

That is, if the final position of the terminal 30 measured before the current time is the position ($L(t_i)$), and the position or the terminal 30 measured before that time is the position ($L(t_{i-1})$), it can be assumed that the object has moved between two points. Then, a distance between the recording area 32 recorded by an arbitrary CCTV and a line segment connecting the locations ($L(t_{i-1})$, $L(t_i)$) of the terminal 30 can be obtained. If this distance is less than a predetermined distance, it can be assumed that the object is exposed to the CCTV video, and then the time the object is exposed to the CCTV is the time between the first time point ($t_{i-1}$) and the second time point ($t_i$). Using this, the time the object is exposed to CCTV can be obtained. If it is determined which point on the line segment connecting the locations ($L(t_{i-1})$, $L(t_i)$) of the terminal 30 is closest to the recording area 32 of the CCTV, it is possible to more accurately detect the time the object is recorded according to the location and the moving speed of the object.

Figure 6:
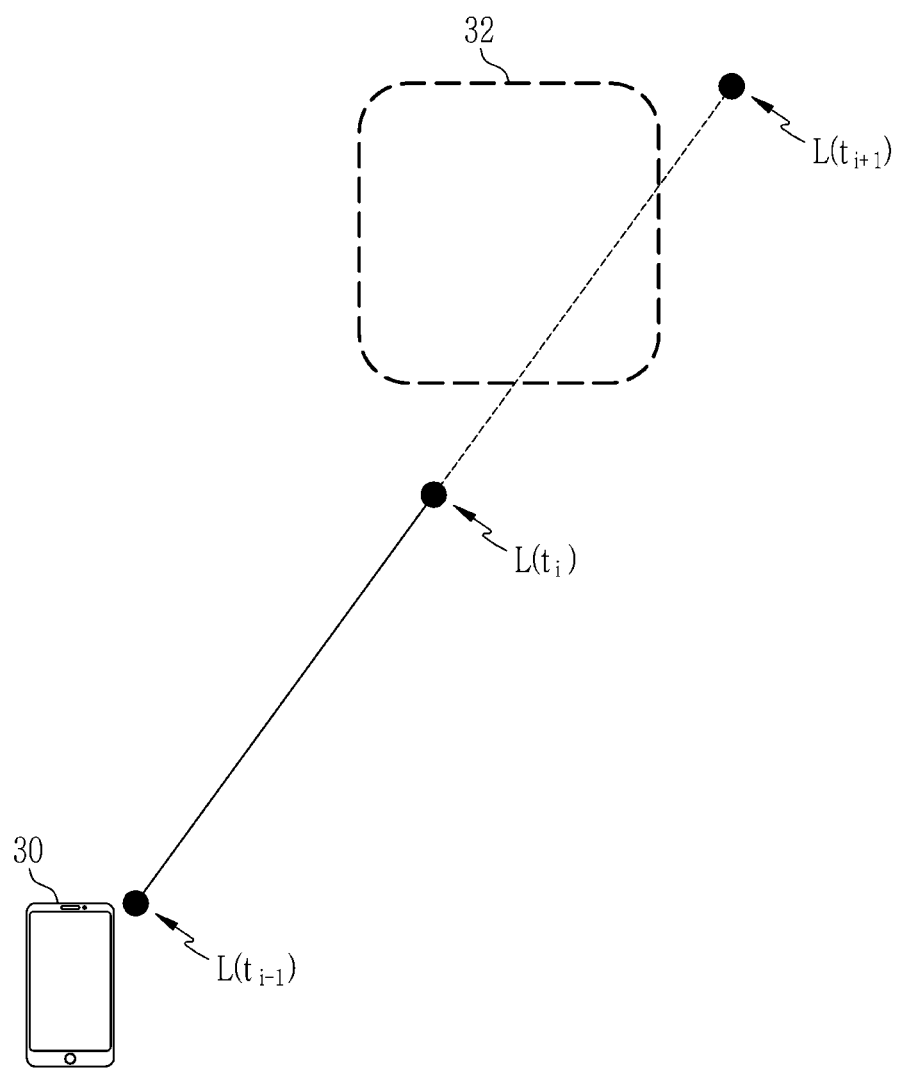
FIG. 6 is a diagram of an object tracking method according to an embodiment of the present disclosure.

FIG. 6 is a diagram of an object tracking method according to an embodiment of the present disclosure.

Referring to FIG. 6, an example method for the current-CCTV detection module 150 to detect a current-CCTV is shown.

The current-CCTV detection module 150 may detect a moving direction of the terminal 30 from the locations of the terminal 30 at a first time point ($t_{i-1}$) and a second time point ($t_i$), and detect, among CCTVs included in the CCTV installation information, a CCTV in which a recording area is located in the moving direction, as the current-CCTV.

In this case, in some embodiments of the present disclosure, the current-CCTV detection module 150 may detect the moving direction of the terminal 30 by using the locations of the terminal 30 at the first time point ($t_{i-1}$) and the second time point ($t_i$).

Alternatively, in some embodiments of the present disclosure, the current-CCTV detection module 150 may detect the moving direction of the terminal 30 using a gyro sensor mounted on the terminal 30.

On the other hand, in some embodiments of the present disclosure, the current-CCTV detection module 150 may detect a time when the object corresponding the identifier is exposed to the recording area based on a moving speed of the terminal 30 and a distance between the recording area and the terminal 30 at the second time point.

In a situation of detecting a CCTV recording at a given reference time or a CCTV to record after a short period of time, based on the reference time, the previous last location is the location $L(t_i)$. By using the direction of a line segment connecting the location ($L(t_{i-1})$) and the location ($L(t_i)$), the moving direction of the terminal 30 at the location ($L(t_i)$) can be derived. Of course, when the gyro sensor is mounted on the terminal 30, it is also possible to derive the moving direction of the terminal 30 at the location ($L(t_i)$) by using the gyro sensor.

When the recording area 32 is sufficiently close from the position ($L(t_i)$), and the recording area 32 is located in the moving direction of the terminal 30, the terminal 30 can be recorded by the CCTV during the time between the second time point ($t_i$) and the third time point ($t_{i+1}$). In this case, the third time point ($t_{i+1}$) must be large enough for the terminal 30 to pass through the recording area 32, which can be detected using the moving speed of the object and the distance between the location ($L(t_i)$) and the recording area 32.

Figure 7:
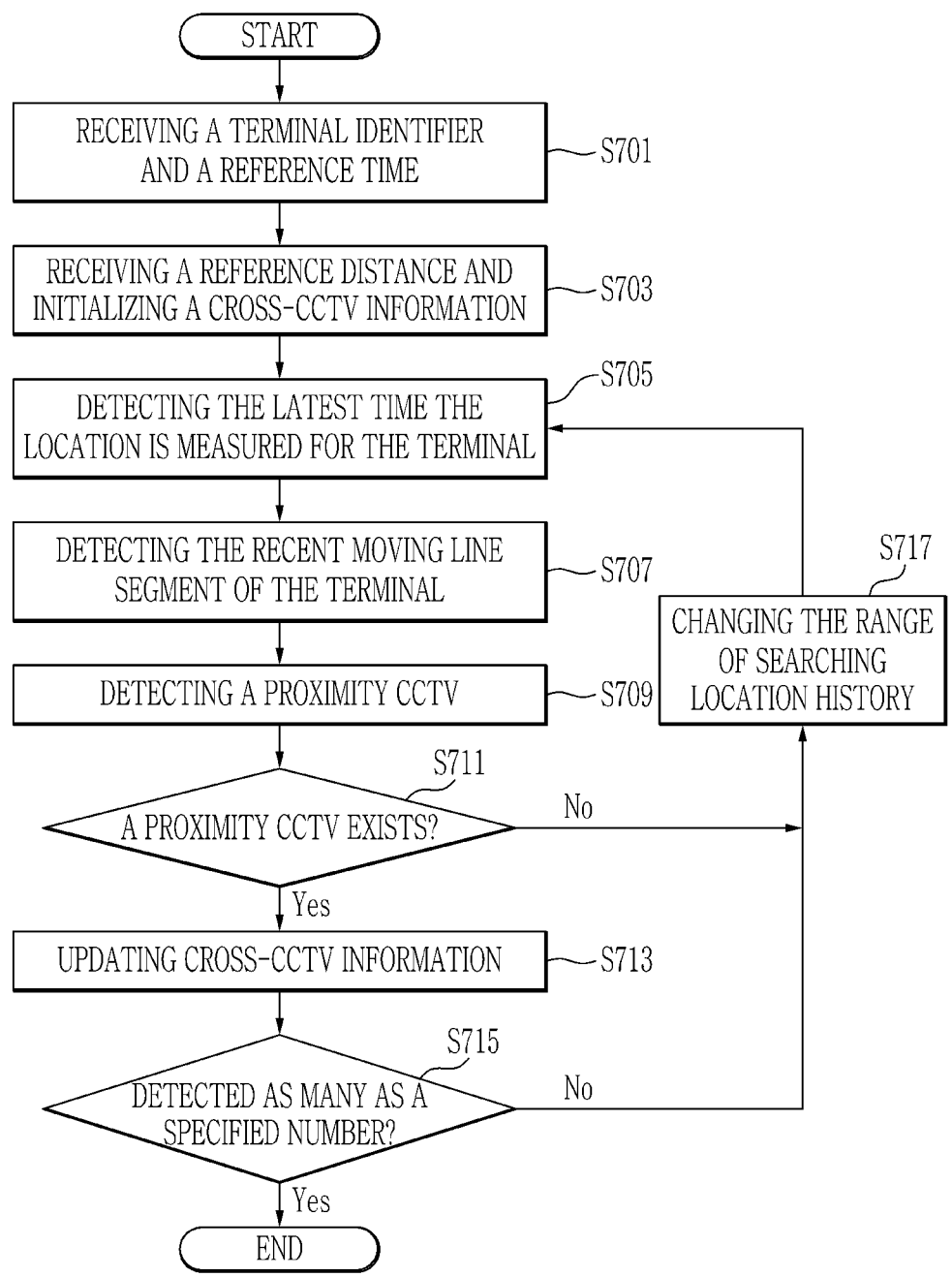
FIG. 7 is a flowchart of an object tracking method according to an embodiment of the present disclosure.

FIG. 7 is a flowchart of an object tracking method according to an embodiment of the present disclosure.

Referring to FIG. 7, an object tracking method according to an embodiment of the present disclosure may include: receiving a terminal identifier (id) and a reference time (t) (S701); receiving a reference distance (cDist) and initialize a cross-CCTV (pCC) information (S703); detecting the latest time ($t_i$) the location is measured for the terminal 30 based on the terminal identifier (id) and the reference time (t) (S705); detecting the recent moving line segment (plink) of the terminal 30 based on the latest time ($t_i$) the location is measured and the terminal identifier (id) (S707); and detecting a proximity CCTV ($CC_i$) based on the recent moving line segment (plink) and the reference distance (cDist) (S709).

In addition, the object tracking method may further include determining whether a proximity CCTV ($CC_i$) exists (S711), and when a proximity CCTV ($CC_i$) is not exist (S711, No), the object tracking method may perform changing the range ($t_i \leftarrow t_{i-1}$) of searching location history (S717), and proceed to S705.

When a proximity CCTV ($CC_i$) exists (S711, Yes), the object tracking method may perform updating cross-CCTV (pCC) information (S713). Here, S713 may be performed by adding a proximity CCTV ($CC_i$) to a cross-CCTV (pCC), but the scope of the present disclosure is not limited thereto.

In addition, the object tracking method may include determining whether cross-CCTV (pCC) has been detected as many as a specified number (S715), and when the cross-CCTV (pCC) has not been detected as many as the specified number (S715, No), the object tracking method may perform changing the range ($t_i \leftarrow t_{i-1}$) of searching location history (S717), and proceed to S705.

In this way, in the situation as shown in FIG. 5, it is possible to detect the set of cross-CCTVs (pCC) which has recently approached within the reference distance (cDist) using the location history.

Figure 8:
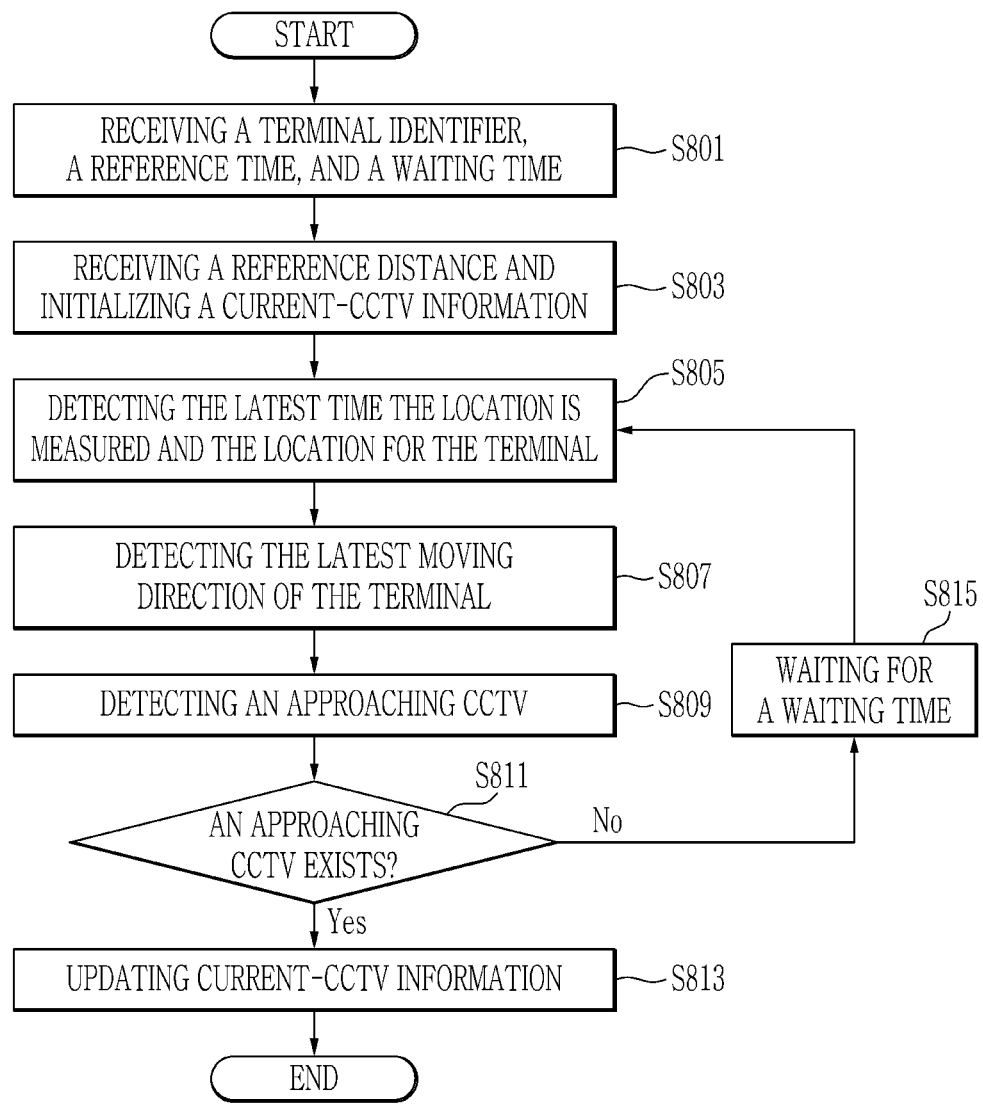
FIG. 8 is a flowchart of an object tracking method according to an embodiment of the present disclosure.

FIG. 8 is a flowchart of an object tracking method according to an embodiment of the present disclosure.

Referring to FIG. 8, an object tracking method according to an embodiment of the present disclosure may include: receiving a terminal identifier (id), a reference time (t), and a waiting time (wt) (S801); receiving a reference distance (cDist) and initialize a current-CCTV (nCC) information (S803); detecting the latest time ($t_i$) the location is measured and the location ($loc_i$) for the terminal 30 based on the terminal identifier (id) and the reference time (t) (S805); detecting the latest moving direction (di) of the terminal 30 based on the latest time ($t_i$) the location is measured and the location ($loc_i$) (S807); and detecting an approaching CCTV ($CC_i$) based on the recent moving direction (di), the location ($loc_i$) and the reference distance (cDist) (S809).

In addition, the object tracking method may further include determining whether an approaching CCTV ($CC_i$) exists (S811), and when an approaching CCTV ($CC_i$) is not exist (S811, No), the object tracking method may perform waiting for a waiting time (wt) (S815), and proceed to S805. In this case, the reference time (t) may be updated to a value in which the waiting time (wt) is considered ($t \leftarrow t+wt$).

When an approaching CCTV ($CC_i$) exists (S811, Yes), the object tracking method may perform updating current-CCTV (nCC) information (S813). Here, step S813 may be performed by adding an approaching CCTV (CCi) to a current-CCTV (nCC), but the scope of the present disclosure is not limited thereto.

In this way, in the situation as shown in FIG. 6, it is possible to detect the set of current-CCTVs (nCC) which is currently recording a target object or is approaching in the future.

Figure 9:
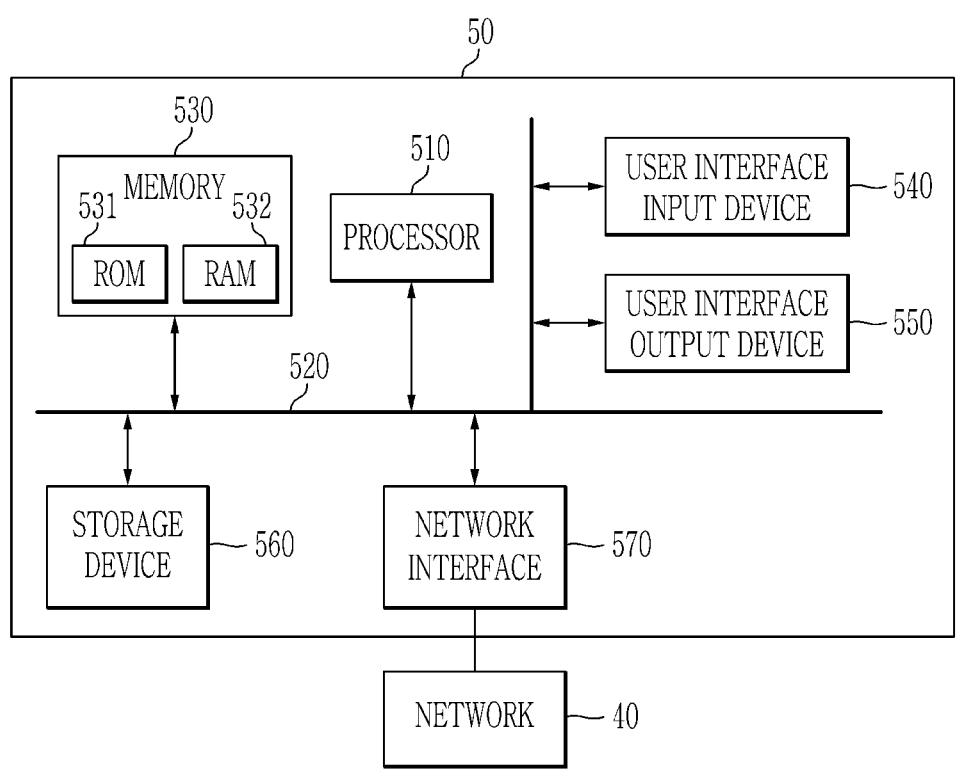
FIG. 9 is a block diagram of a computing device for implementing an object tracking system and method according to an embodiment of the present disclosure.

FIG. 9 is a block diagram of a computing device for implementing an object tracking system and method according to an embodiment of the present disclosure.

Referring to FIG. 9, an object tracking system and method according to an embodiment of the present disclosure may be implemented using a computing device 50.

The computing device 50 includes at least one of a processor 510, a memory 530, a user interface input device 540, a user interface output device 550, and a storage device 560 communicating through a bus 520. The computing device 50 may also include a network 40, such as a network interface 570 that is electrically connected to a wireless network. The network interface 570 may transmit or receive signals with other entities through the network 40.

The processor 510 may be implemented in various types such as an application processor (AP), a central processing unit (CPU), and a graphic processing unit (GPU), and may be any semiconductor device which executes instructions stored in the memory 530 or the storage device 560. The processor 510 may be configured to implement the functions and methods described in FIG. 1 to FIG. 8.

The memory 530 and the storage device 560 may include various types of volatile or nonvolatile storage media. For example, the memory may include read-only memory (ROM) 531 and random access memory (RAM) 532. In an embodiment of the present disclosure, the memory 530 may be located inside or outside the processor 510, and the memory 530 may be connected to the processor 510 through various known means.

In addition, at least some of an object tracking system and method according to embodiments of the present disclosure may be implemented as a program or software executed on the computing device 50, and the program or software may be stored in a computer-readable medium.

In addition, at least some of an object tracking system and method according to embodiments of the present disclosure may be implemented with hardware that can be electrically connected to the computing device 50.

According to the embodiments of the present disclosure described so far, through a terminal capable of location tracking, it is possible to collect the location history and the current location of the terminal, and detect a CCTV in which a object that moves while carrying the terminal was recorded, the recording time, the moving direction of the object, the moving speed and so on, it is possible to efficiently perform object detection from CCTV video. In addition, according to embodiments of the present disclosure, through a terminal capable of location tracking, it is possible to efficiently track a target object from a plurality of CCTV videos.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An object tracking system, the system comprising:
   one or more processors configured to execute instructions; and
   a memory storing instructions, wherein execution of the instructions by the one or more processors configure the one or more processors to:
   receive an identifier of a terminal and a reference time to track an object corresponding to the identifier;
   detect a cross-closed circuit television (CCTV) for the terminal by using a CCTV installation information and a location of the terminal before the reference time;
   detect an object repeatedly appearing in the cross-CCTV as a basic image;
   detect a current-CCTV currently recording the terminal by detecting a location and a moving direction of the terminal after the reference time;
   detect an object appearing in the current-CCTV based on the location and the moving direction of the terminal after the reference time; and
   track an object corresponding to the identifier by determining whether the detected object from the current-CCTV is re-identified from the basic image.

2. The system of claim 1, wherein the one or more processors are further configured to:
   detect locations of the terminal at a first time point and a second time point, and detect, among CCTVs included in the CCTV installation information, a CCTV in which a recording area is located within a predetermined distance from a line segment connecting the locations of the terminal, as the cross-CCTV.

3. The system of claim 2, wherein the one or more processors are further configured to:
detect a time when the object corresponding the identifier is exposed to the recording area based on a distance between the recording area and the line segment.

4. The system of claim 2, wherein, when the cross-CCTV is not detected, the one or more processors are further configured to:
detect the cross-CCTV for the terminal by using the CCTV installation information and the location of the terminal at a time earlier than the reference time.

5. The system of claim 1, wherein the one or more processors are further configured to:
detect a moving direction of the terminal from the locations of the terminal at a first time point and a second time point, and detect, among CCTVs included in the CCTV installation information, a CCTV in which a recording area is located in the moving direction, as the current-CCTV.

6. The system of claim 5, wherein the one or more processors are further configured to:
determine a time when the object corresponding to the identifier is exposed to the recording area based on a moving speed of the terminal and a distance moved within the recording area to the terminal at the second time point.

7. The system of claim 5, wherein the one or more processors are further configured to:
when the current-CCTV is not detected, after waiting for a predetermined time, detect the current-CCTV by detecting the location and the moving direction of the terminal.

8. The system of claim 5, wherein the one or more processors are further configured to:
detect a moving direction of the terminal by using the locations of the terminal at the first time point and the second time point.

9. The system of claim 5, wherein the one or more processors are further configured to:
detect a moving direction of the terminal by using a gyro sensor mounted on the terminal.

10. The system of claim 1, wherein the one or more processors are further configured to:
update an object detected from the current-CCTV to the basic image, and
track an object corresponding to the identifier by determining whether the detected object from the current-CCTV is re-identified from the updated basic image.

11. An object tracking system, the system comprising:
one or more processors configured to execute instructions; and
a memory storing instructions, wherein execution of the instructions by the one or more processors configure the one or more processors to:
detect a cross-closed circuit television (CCTV) for a terminal by using a CCTV installation information and a location of the terminal before a reference time;
detect an object repeatedly appearing in the cross-CCTV as a basic image;
detect a current-CCTV currently recording the terminal by detecting a location and a moving direction of the terminal after the reference time;
detect an object appearing in the current-CCTV based on the location and the moving direction of the terminal after the reference time, track an object corresponding to the identifier by determining whether the detected object from the current-CCTV is re-identified from the basic image, and
update an object detected from the current-CCTV, to the basic image.

12. The system of claim 11, wherein the one or more processors are further configured to:
track an object corresponding to the identifier by determining whether the detected object from the current-CCTV is re-identified from the updated basic image.

13. The system of claim 11, wherein the one or more processors are further configured to:
detect locations of the terminal at a first time point and a second time point, and detect, among CCTVs included in the CCTV installation information, a CCTV in which a recording area is located within a predetermined distance from a line segment connecting the locations of the terminal, as the cross-CCTV.

14. The system of claim 11, wherein the one or more processors are further configured to:
detect a moving direction of the terminal from the locations of the terminal at a first time point and a second time point, and detect, among CCTVs included in the CCTV installation information, a CCTV in which a recording area is located in the moving direction, as the current-CCTV.

15. An object tracking method, the method comprising:
receiving an identifier of a terminal and a reference time to track an object corresponding to the identifier;
detecting a cross-CCTV for the terminal by using a closed circuit television (CCTV) installation information and a location of the terminal before the reference time;
detecting an object repeatedly appearing in the cross-CCTV as a basic image;
detecting a current-CCTV currently recording the terminal by detecting a location and a moving direction of the terminal after the reference time;
detecting an object appearing in the current-CCTV based on the location and the moving direction of the terminal after the reference time; and
tracking an object corresponding to the identifier by determining whether the detected object from the current-CCTV is re-identified from the basic image.

16. The method of claim 15, wherein the detecting a cross-CCTV for the terminal by using a CCTV installation information and a location of the terminal before the reference time comprises:
detecting locations of the terminal at a first time point and a second time point, and detecting, among CCTVs included in the CCTV installation information, a CCTV in which a recording area is located within a predetermined distance from a line segment connecting the locations of the terminal, as the cross-CCTV.

17. The method of claim 16, wherein the detecting, among CCTVs included in the CCTV installation information, a CCTV in which a recording area is located within a predetermined distance from a line segment connecting the locations of the terminal, as the cross-CCTV comprises:
when the cross-CCTV is not detected, detecting the cross-CCTV for the terminal by using the CCTV installation information and the location of the terminal at a time earlier than the reference time.

18. The method of claim 15, wherein the detecting a current-CCTV currently recording the terminal by detecting a location and a moving direction of the terminal after the reference time comprises:

detecting a moving direction of the terminal from the locations of the terminal at a first time point and a second time point, and detecting, among CCTVs included in the CCTV installation information, a CCTV in which a recording area is located in the moving direction, as the current-CCTV.

19. The method of claim 18, wherein the detecting, among CCTVs included in the CCTV installation information, a CCTV in which a recording area is located in the moving direction, as the current-CCTV, comprises:

when the current-CCTV is not detected, after waiting for a predetermined time, detecting the current-CCTV by detecting the location and the moving direction of the terminal.

20. The method of claim 15, wherein:

the detecting an object repeatedly appearing in the cross-CCTV as a basic image comprises, updating an object detected from the current-CCTV, to the basic image, wherein the tracking an object corresponding to the identifier by determining whether the detected object from the current-CCTV and the basic image comprises, tracking an object corresponding to the identifier by determining whether the detected object from the current-CCTV is re-identified from the updated basic image.

* * * * *